June 9, 1959.  R. K. HEDGE  2,889,579
VULCANIZER
Filed Feb. 18, 1958

RUSSELL K. HEDGE
INVENTOR
BY *Wm T. Meg*
ATTORNEY

United States Patent Office 2,889,579
Patented June 9, 1959

2,889,579

VULCANIZER

Russell K. Hedge, Burlington, Iowa

Application February 18, 1958, Serial No. 715,878

5 Claims. (Cl. 18—18)

This invention pertains to a vulcanizer and more particularly a vulcanizer to be used to repair tires.

To repair breaks and punctures in tires the vulcanizer must be able to treat irregular surfaces and all parts of the tire. The field of tire vulcanizing has had the disadvantage of having to change pressure plates to repair different parts of the tire.

It is therefore an object of this invention to provide a vulcanizer by the use of which it is possible to vulcanize all parts of a tire with one pressure plate.

It is a further object of this invention to provide a vulcanizer for use with tires having the treads with irregular shapes.

A further object of this invention is to provide a vulcanizer that is inexpensive to operate and easily adaptable to all operations of vulcanizing tires.

Other objects and advantages of this invention will become more readily apparent from the following drawings, descriptions and claims.

Figure 1:
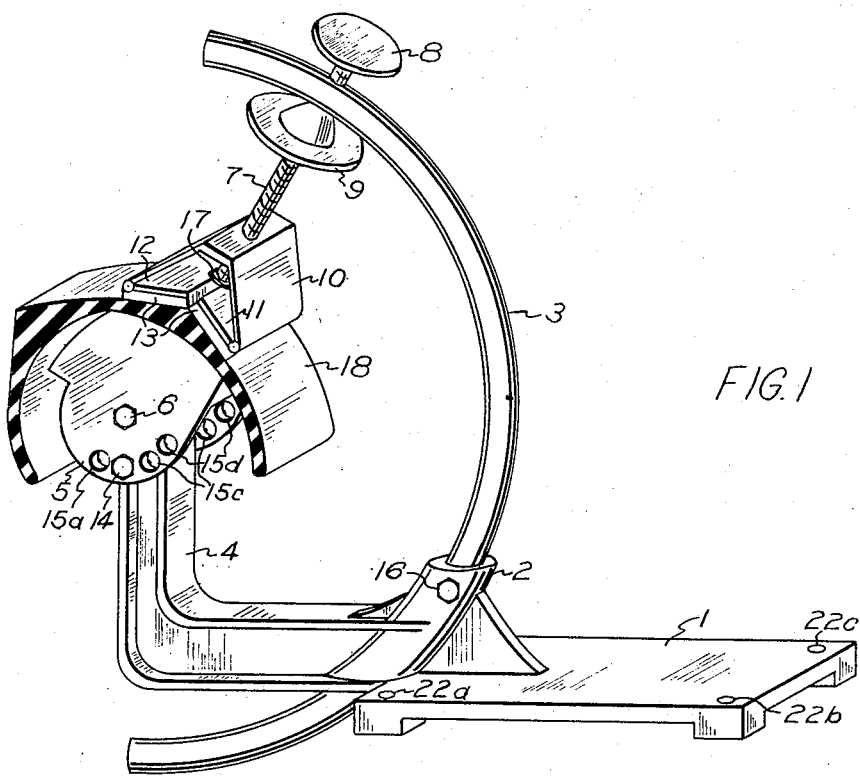
Figure 2:
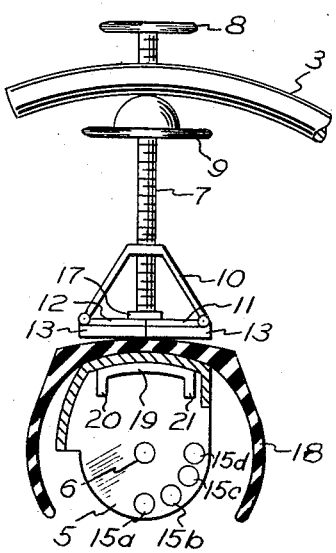

In the drawings Figure 1 is a perspective view of the vulcanizer and Figure 2 is a partial sectional view of the upper portion of the vulcanizer.

The vulcanizer is composed of a base 1 having a cylindrical portion 2 which slidably receives a curved arm 3. An arm 4 of the base 1 holds a head 5 which is attached to the arm 4 of the base 1 by a bolt 6. The curved arm 3 has a pressure screw 7 inserted slidably through its uppermost portion. The pressure screw 7 has at its outer extremity a hand-wheel 8 attached thereto. On the opposite side of the curved arm 3 from the hand-wheel 8 is a second hand-wheel 9 threaded on the pressure screw 7. The pressure screw 7 is threaded through a frame 10 having hinged thereto pressure plates 11 and 12. The pressure plates 11 and 12 may be faced with a synthetic product or other suitable material 13. The head 5 is adjustable on the arm 4 by means of the bolt 14 and the holes 15 in the head 5, and a hole in the arm 4. The curved arm 3 is adjustable in the cylindrical portion 2 of the base 1 by the bolt 16. The pressure screw 7 has a disk 17 attached to its lower extremity to contact the pressure plates 11 and 12.

A tire is vulcanized by placing it on the head 5. A section 18 of the tire is shown in the figures. The tire 18 remains in an upright position and the head 5 is adjusted to be under the portion of the tire 18 which is punctured by means of the fastening of the bolt 14 through the holes 15 and a hole in the arm 4 of the base 1. The curved arm 3 is then slid through the cylindrical portion 2 of the base 1 until the pressure screw 7 is in line with the puncture in the tire 18. The hand-wheel 9 is then turned to bring the facing 13 in contact with the tire 18. The facing 13 on the pressure plates 11 and 12 is then made to conform to the contour of the surface of the tire 18 by turning the hand-wheel 8. Heat is then applied to the head 5 by connecting the heating unit 19 shown in Fig. 2 at points 20 and 21 to an electrical outlet. The base 1 can be mounted on a bench by bolting through the holes 22.

The vulcanizer can be used on the sidewall of the tire 18 by changing the head 5 to a position where the bolt 14 is fastened through the holes 15d and the hole in the arm 4 of the base 1. The curved arm 3 is then adjusted so that the pressure screw 7 is in line with the head 5. The facing 13 is then brought in contact with the side of the tire 18 by turning the hand-wheel 9 and made to conform to the shape of the side of the tire 18 by turning the hand-wheel 8.

As shown in Fig. 2, the tread of the tire can be vulcanized by the same procedure. The curved arm 3 is adjusted in the cylindrical portion 2 of the base 1 so that the pressure screw 7 is in line with the head 5 which is fastened to the arm 4 of the base 1 by placing the bolt 14 through the holes 15a in the head 5 and the hole in the arm 4 of the base 1. The pressure plates 11 and 12 and their facing 13 can be made to vary by means of turning the hand-wheel 8 from a concave position as shown in Fig. 1 to a convex position which would be used when the tire tread to be vulcanized has heavy ridges, such as in tractor tires.

The vulcanizer has many applications that are not above set out and this description is not intended to be limited to all the applications of the vulcanizer. It can be readily seen that the vulcanizer could be used by heating the pressure plates rather than the head or by heating both the head and the pressure plates, and electrical heat need not necessarily be used, but other methods of heating could be used.

I claim:

1. A vulcanizer comprised of a base, a head adjustably mounted on the base, an arm slidably mounted on the base, a pressure screw inserted slidably through the arm, a frame threaded on the pressure screw, several pressure plates pivotably mounted on the frame, a facing mounted on the pressure plates, a hand-wheel fastened to the outer extremity of the pressure screw, a disk fastened to the other extremity of the pressure screw so disposed as to contact the pressure plates, another hand-wheel threaded on the pressure screw between the arm and the frame and a means for heating the pressure plates.

2. A vulcanizer comprised of a base, a head adjustably mounted on the base, an arm slidably mounted on the base, a pressure screw inserted slidably through the arm, a frame threaded on the pressure screw, several pressure plates pivotably mounted on the frame, a facing mounted on the pressure plates, a hand-wheel fastened to the outer extremity of the pressure screw, a disk fastened to the other extremity of the pressure screw so disposed as to contact the pressure plates, another hand-wheel threaded on the pressure screw between the arm and the frame and a means for heating the head.

3. A vulcanizer comprised of a base, a head adjustably mounted on the base, an arm slidably mounted on the base, a pressure screw inserted slidably through the arm, a frame threaded on the pressure screw, several pressure plates pivotably mounted on the frame, a hand-wheel fastened to the outer extremity of the pressure screw, a disk fastened to the other extremity of the pressure screw so disposed as to contact the pressure plates, a means to apply pressure between the arm and the frame and a means for heating the pressure plates.

4. A vulcanizer comprised of a base, a head adjustably mounted on the base, an arm slidably mounted on the base, a pressure screw inserted slidably through the arm, a frame threaded on the pressure screw, several pressure plates pivotably mounted on the frame, a facing mounted on the pressure plates, a hand-wheel fastened to the outer extremity of the pressure screw, a disk fastened to the other extremity of the pressure screw so disposed as to contact the pressure plates, a means to apply pressure between the arm and the frame and a means for heating the head.

5. A vulcanizer comprised of a base, a head adjustably mounted on the base, an arm slidably mounted on the base, a pressure screw inserted slidably through the arm, a frame threaded on the pressure screw, several pressure plates pivotably mounted on the frame, a hand-wheel fastened to the outer extremity of the pressure screw, a disk fastened to the other extremity of the pressure screw so disposed as to contact the pressure plates, another hand-wheel threaded on the pressure screw between the arm and the frame and a means for heating the pressure plates.

References Cited in the file of this patent

UNITED STATES PATENTS

| | | |
|---|---|---|
| 2,347,952 | James | May 2, 1944 |
| 2,814,073 | Van Scoyk | Nov. 26, 1957 |
| 2,852,810 | Gruber | Sept. 23, 1958 |